US007755864B2

(12) United States Patent
Kato et al.

(10) Patent No.: US 7,755,864 B2
(45) Date of Patent: Jul. 13, 2010

(54) MAGNETIC RECORDING HEAD FOR PERPENDICULAR RECORDING, FABRICATION PROCESS, AND MAGNETIC DISK STORAGE APPARATUS MOUNTING THE MAGNETIC RECORDING HEAD

(75) Inventors: Atsushi Kato, Kanagawa (JP); Tomohiro Okada, Kanagawa (JP); Masahiko Soga, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 566 days.

(21) Appl. No.: 11/259,693

(22) Filed: Oct. 25, 2005

(65) Prior Publication Data

US 2006/0087770 A1   Apr. 27, 2006

(30) Foreign Application Priority Data

Oct. 27, 2004   (JP) .............................. 2004-312845

(51) Int. Cl.
*G11B 5/48* (2006.01)
(52) U.S. Cl. .............. 360/234.5; 360/123.1; 360/125.3; 360/235.7; 360/236.5
(58) Field of Classification Search .............. 360/234.5, 360/123.02, 123.06, 123.1, 123.12, 125.02, 360/125.03, 125.3, 235.7, 236.5, 320
See application file for complete search history.

(56) References Cited

U.S. PATENT DOCUMENTS

| 4,949,209 | A | * | 8/1990 | Imanaka et al. .......... 360/125.5 |
| 5,272,582 | A | * | 12/1993 | Shibata et al. .............. 360/323 |
| 5,557,492 | A | * | 9/1996 | Gill et al. ..................... 360/319 |
| 5,768,070 | A | * | 6/1998 | Krounbi et al. .......... 360/318.1 |
| 6,158,108 | A | * | 12/2000 | Seagle ...................... 29/603.14 |
| 6,324,036 | B1 | * | 11/2001 | Dill et al. .................... 360/320 |
| 6,477,008 | B1 | * | 11/2002 | Chang et al. ................. 360/128 |
| 6,859,346 | B1 | * | 2/2005 | Meyer ..................... 360/294.5 |
| 7,027,264 | B1 | * | 4/2006 | Subrahmanyam et al. ....................... 360/234.5 |
| 7,042,683 | B1 | * | 5/2006 | Cross et al. ................. 360/319 |

(Continued)

FOREIGN PATENT DOCUMENTS

JP   2001-176031   6/2001

(Continued)

*Primary Examiner*—William J Klimowicz
*Assistant Examiner*—Carlos E Garcia
(74) *Attorney, Agent, or Firm*—GMG Intellectual Property Law; Guadalupe M. Garcia (57) ABSTRACT

Embodiments of the invention provide a head which can prevent an external magnetic field form erasing a signal on the medium and whose main magnetic pole piece does not corrode during processing of the air bearing surface. In one embodiment, an anti-corrosion electrode is formed to apply a voltage to the main magnetic pole piece during processing of the air bearing surface. This retards corrosion of the main magnetic pole piece. Since a conductor (anti-corrosion wire) connected to this anti-corrosion electrode is made of a non-magnetic material, concentration of an external magnetic field into the main magnetic pole piece can be suppressed. Consequently, since the magnetic leakage field emitted from the main magnetic pole piece is reduced, erasure of the signal on the medium can be prevented. In addition, since the anti-corrosion wire is connected to the upper core, this wire can be formed in the same wiring layer as a wire which connects the coil to a write terminal, resulting in a simplified manufacturing process.

9 Claims, 11 Drawing Sheets

U.S. PATENT DOCUMENTS

| | | | |
|---|---|---|---|
| 7,193,817 B2* | 3/2007 | Lille | 360/128 |
| 2002/0030946 A1* | 3/2002 | Shimazawa | 360/319 |
| 2003/0099054 A1* | 5/2003 | Kamijima | 360/59 |
| 2003/0128469 A1* | 7/2003 | Pust et al. | 360/234.5 |
| 2003/0206373 A1* | 11/2003 | Kato et al. | 360/234.5 |
| 2005/0036238 A1* | 2/2005 | Tabakovic et al. | 360/234.5 |

FOREIGN PATENT DOCUMENTS

| | | |
|---|---|---|
| JP | 2003-077105 | 3/2003 |
| JP | 2003-123210 | 4/2003 |

* cited by examiner

PRIOR ART

MAGNETIC RECORDING HEAD FOR PERPENDICULAR RECORDING, FABRICATION PROCESS, AND MAGNETIC DISK STORAGE APPARATUS MOUNTING THE MAGNETIC RECORDING HEAD

CROSS-REFERENCES TO RELATED APPLICATIONS

This application claims priority from Japanese Patent Application No. JP 2004-312845, filed Oct. 27, 2004, the entire disclosure of which is incorporated herein by reference.

BACKGROUND OF THE INVENTION

The magnetic disk drive comprises a magnetic head to read and write data on a recording medium. To raise the recording capacity per unit area of the magnetic disk, it is necessary to raise the areal recording density. In the conventional longitudinal recording system, however, if the recorded bit length is short, it is not possible to raise the areal recording density due to thermal fluctuations of the medium in magnetization. A solution to this problem is the perpendicular recording system which perpendicularly records a magnetization signal on the medium. For perpendicular recording, the GMR (Giant Magneto-Resistive) head, the TMR (Tunneling giant Magneto-Resistive) head providing further higher read output and the CPP (Current Perpendicular to the Plane) type GMR head which passes current perpendicularly to the plane of the film can be used as well.

In a perpendicular recording system, a double-layered recording medium having a soft magnetic underlayer called a SLU (Soft Under Layer) is used with a single-pole write head having a main magnetic pole piece and an auxiliary magnetic pole piece. The presence of the SLU in the perpendicular recording system raises the writing ability of the head. Since the head can therefore produce a recording magnetic field beyond 10 T (teslas), it is possible to use such a highly coercive recording medium as to have a coercive force of 6 kOe or higher. Although perpendicular recording provides such high writability, however, it is pointed out that external magnetic fields concentrate in the main magnetic pole piece and may erase a signal written on the medium. For example, Patent Document 1 (Japanese Patent Laid-Open No. 2003-123210) discloses a technique to prevent external magnetic filed from entering the main magnetic pole piece by incorporating a shield.

In order to make higher the recording magnetic field, the above-mentioned main magnetic pole piece is made of some of Fe- or Co-based metals having high saturation magnetic flux densities (Bs). Although their saturation flux densities Bs are high, these materials are apt to corrode due to poor corrosion resistance.

Disclosed in Patent Document 2 (Japanese Patent Laid-Open No. 2003-77105) is a configuration which allows the use of such a high saturation flux density metal. To prevent its corrosion during processing in an aqueous solution, an external terminal is provided which is connected to the lower magnetic pole piece. The standard electrode potential of this terminal is higher than that of the magnetic film and its surface area is larger than the cross-sectional area of the magnetic film on the air bearing surface facing the magnetic recording medium. In addition, it is disclosed that an internal metal film made of Cu is used to electrically connect the lower magnetic pole piece and the external terminal. The lower magnetic pole piece is extended to a section where it is connected with the upper magnetic pole piece and to a section above which the coil is connected with wires leading to the recording terminals.

BRIEF SUMMARY OF THE INVENTION

A problem with perpendicular recording is that magnetic field signal on the medium may be erased by an external magnetic field. In addition, if high Bs material is used in order to raise the recording ability, since the high Bs material corrodes while the air bearing surface is processed, the air bearing surface may have such irregularities as to deteriorate the magnetic properties. Therefore, it is a feature of the present invention to provide a head structure which suppresses corrosion during processing of the air bearing surface and thereby provide a perpendicular recording magnetic head which is superior in recording ability and does not cause erasure by an external magnetic field.

In summary, according to an aspect of the present invention, there is provided a magnetic slider which comprises: a read head provided with a magnetoresistive film; a write head provided with a main magnetic pole piece, an auxiliary magnetic pole piece and a coil; a first wire connected with the coil; a terminal which is electrically connected with the write head and is formed externally; and a second wire which electrically connects the terminal and the main magnetic pole piece; wherein the first and second wires are formed in the same wiring layer.

According to the present invention, there is provided a perpendicular recording magnetic head which not only prevents corrosion of the main magnetic pole piece during processing of the air bearing surface but also suppresses erasing action due to external magnetic field.

DETAILED DESCRIPTION OF THE INVENTION

With reference to the drawings, the following will describe specific embodiments of the present invention. To facilitate understanding of the following description, functionally identical elements are given the same reference numeral common to the drawings.

Embodiment 1

Figure 1:
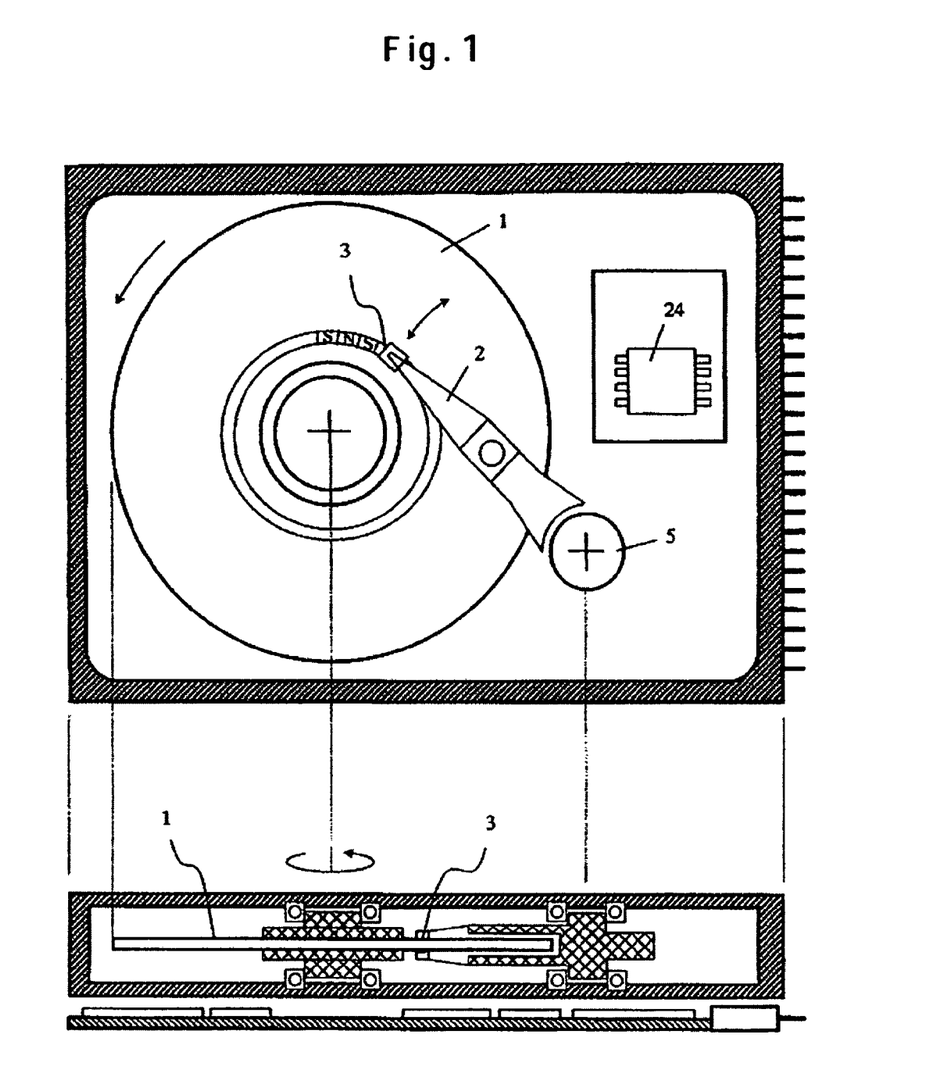
FIG. 1 schematically depicts a magnetic recording and reproducing device.

FIG. 1 schematically depicts a magnetic recording and reproducing device. The upper diagram provides its top view whereas the lower diagram provides its sectional view. In the magnetic recording and reproducing device, a magnetization signal is written and read on a motor-driven rotating magnetic disk by a magnetic head 3 fixed on the tip of an arm 2 above the magnetic disk 1. The arm 2 is driven in the disk's radial direction by an actuator 5 to locate a track for read or write. The magnetic slider 3 is held by the arm via gimbals. The write signal to energize the magnetic head in the slider 3 or the read signal sent out from the magnetic head is processed by a signal processing circuit 24.

Figure 2:
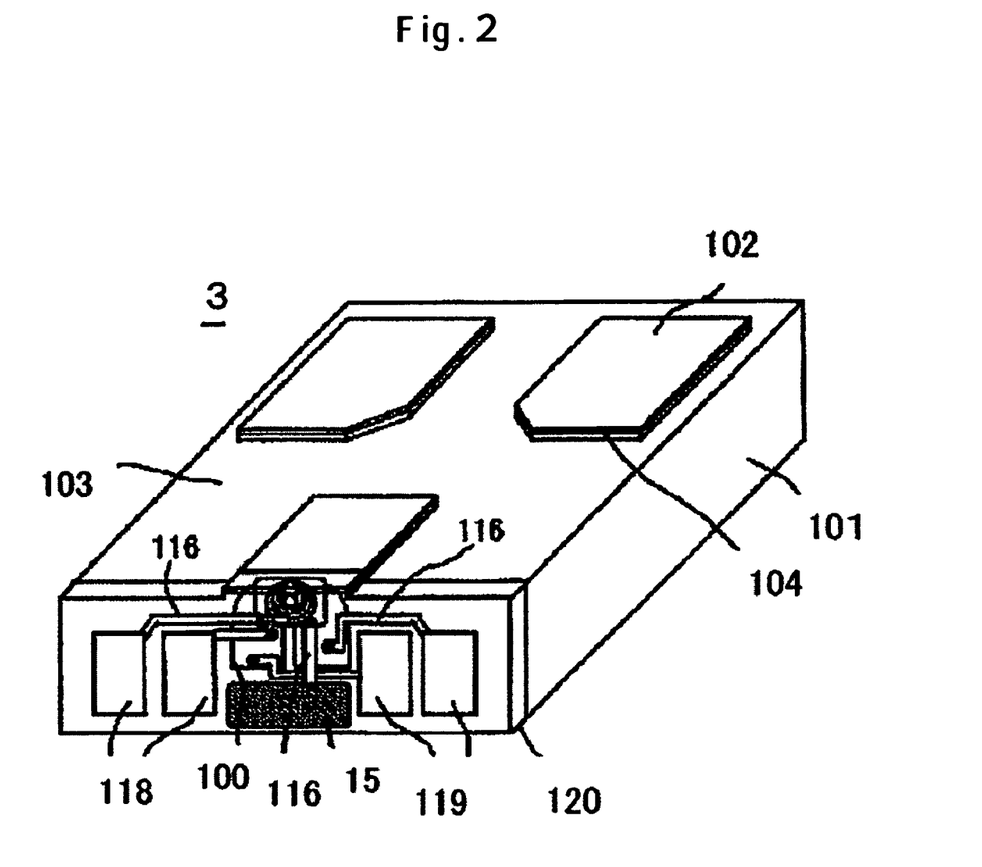
FIG. 2 shows the external appearance of a magnetic slider.

FIG. 2 schematically depicts the configuration of the magnetic slider 3. Reference numeral 101 refers to a substrate. Reference numeral 100 is a magnetic read-write element constructed of a combination of a magnetic read element and a magnetic write element which are formed on the substrate 101. Reference numeral 15 is a terminal formed in electrically conductive contact with an internal metal film. Reference numeral 118 is a write relay terminal to electrically connect the coil of the magnetic write element to the external. Reference numeral 119 is a read relay terminal to electrically connect the magnetic read element to the external. Reference numeral 120 is a thin film magnetic head. Reference numeral 116 refers to internal wires including a wire to electrically connect the magnetic read/write element to the read/write relay terminal and a wire to electrically connect the anti-corrosion electrode to the magnetic pole piece. Reference numeral 102 is an air bearing rail formed on a side of the substrate 101 which faces the magnetic recording medium 1. Reference numeral 103 is an air bearing surface formed on the side of the substrate 101 on which the air bearing rails 102 are formed and facing the magnetic recording medium 1. Reference numeral 3 is a thin film magnetic head slider having the thin film magnetic head 120, the air bearing rails 102 and the air bearing surface (ABS) 103. The terminal 15 is an external conductor formed to allow electrically conductive contact with the magnetic write element. This terminal 15 is formed in the same plane as the write relay terminal 118 and the read relay terminal 119 which are exposed as part of a side of the thin film magnetic head slider 1.

Figure 3:
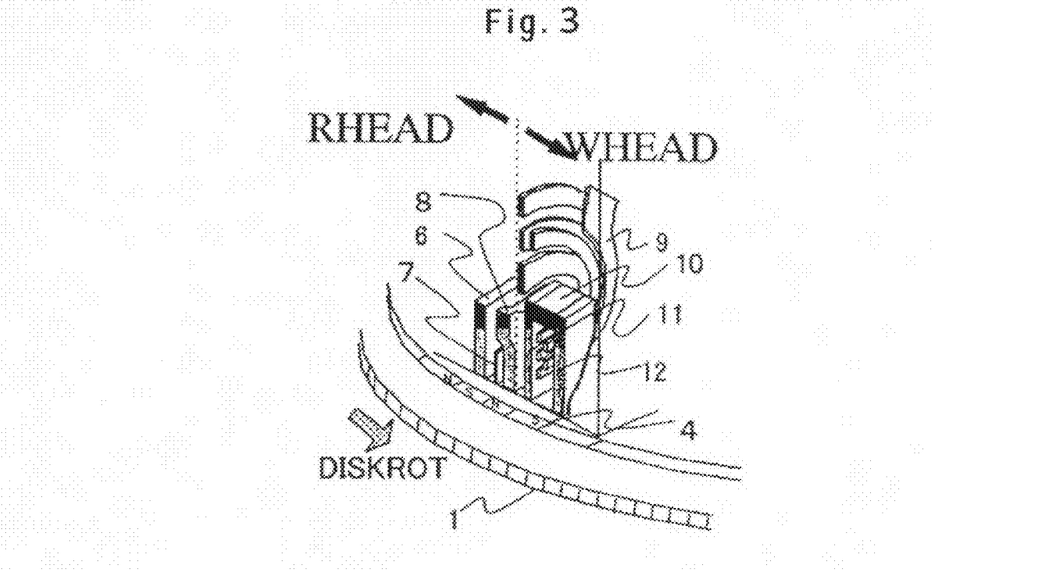
FIG. 3 shows the relation of the magnetic recording and reproducing device with a magnetic disk.

FIG. 3 schematically shows how perpendicular recording is done. The magnetic head comprises the write head WHEAD and the read head RHEAD. The magnetic disk 1 comprises an adhesion layer, a soft magnetic layer, an intermediate layer, a recording layer, a protective film and a lubricant layer which are laminated in this order on the substrate. During operation, the magnetic disk 1 rotates in the counter-clockwise direction DISKROT as viewed from the magnetic slider. The recording layer has a granular structure. The write head generates a magnetic field for recording in the recording layer of the magnetic disk 1. The write head is a single-pole head comprising: a magnetic circuit constructed of a main magnetic pole piece 12, an auxiliary magnetic pole piece 11 and a connecting part 10 connecting the main magnetic pole piece 12 and the auxiliary magnetic pole piece 11; and a thin film coil 9 intersecting the magnetic circuit. The read head is a head operable to read information written in the recording layer of the magnetic disk 1. The read head comprises a read element, 7 such as a GMR element, sandwiched between a pair of read shields 6 and 8. The magnetic field going out from the main magnetic pole piece 12 passes through the recording layer and soft magnetic underlayer of the magnetic disk 1 and enters the auxiliary magnetic pole piece 11, forming a magnetic circuit to record a magnetization pattern 4 in the recording layer. The formation of the magnetization pattern is greatly dependent on the shape of the upper side surface (trailing side) of the main magnetic pole piece 12 or the last part to depart from any point on the magnetic disk 1 due to the rotating direction of the disk. This may result in erasing the signal on the medium in the disk drive.

Figure 4:
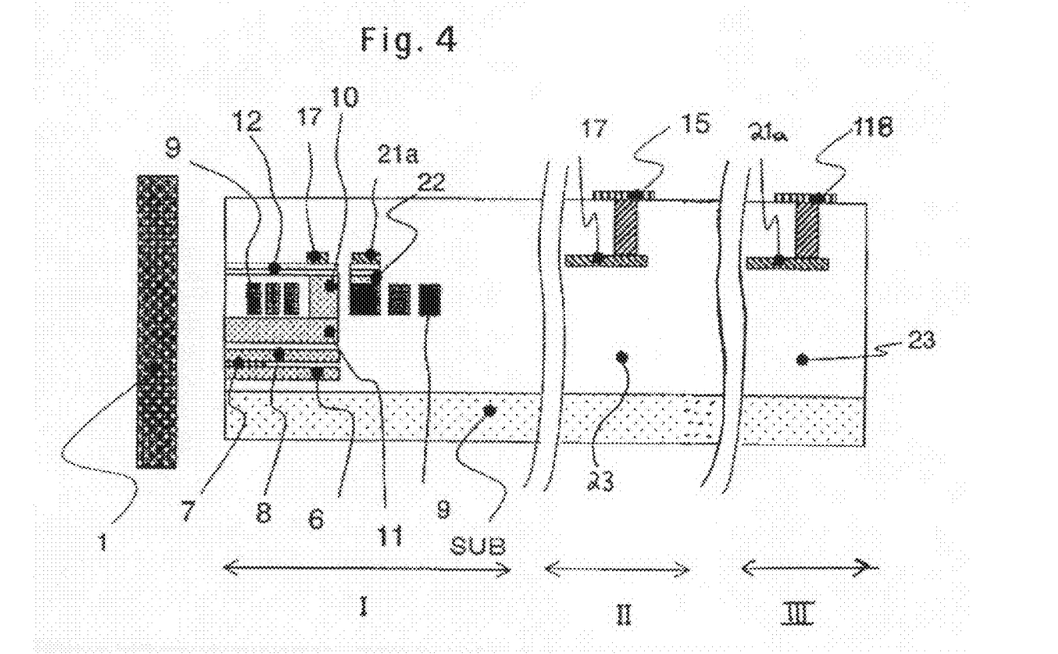
FIG. 4 is a sectional view of a magnetic head (first embodiment).
Figure 5:
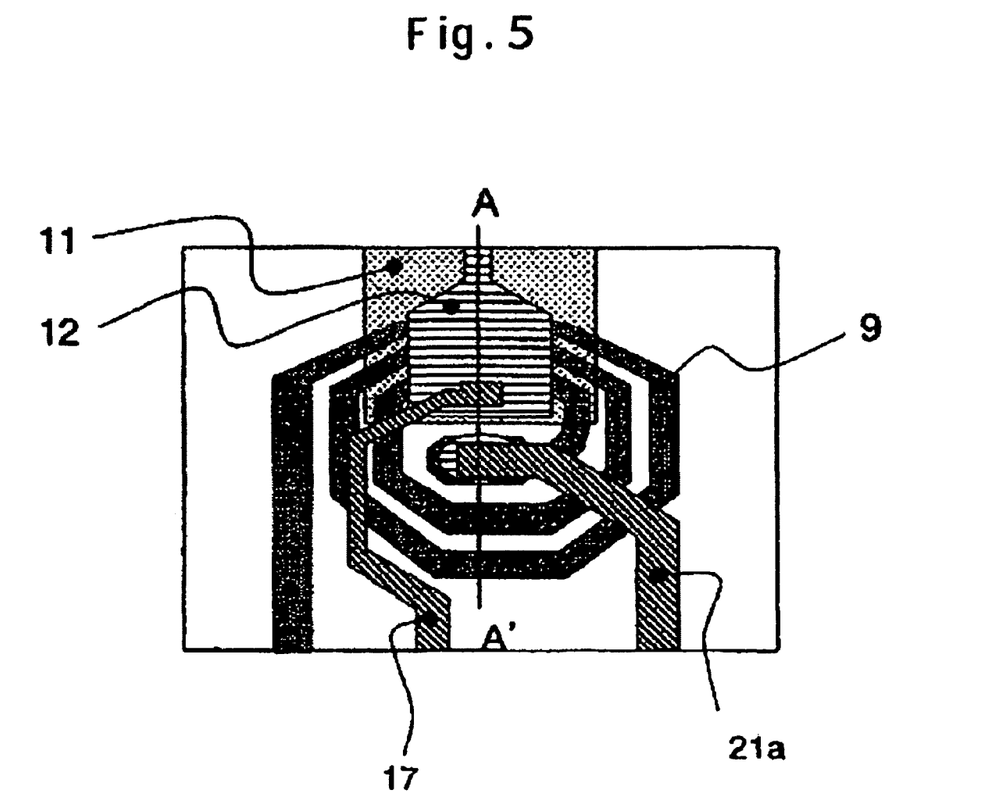
FIG. 5 is a plan view of the magnetic head (first embodiment) depicted in a superimposed manner.
Figure 6:
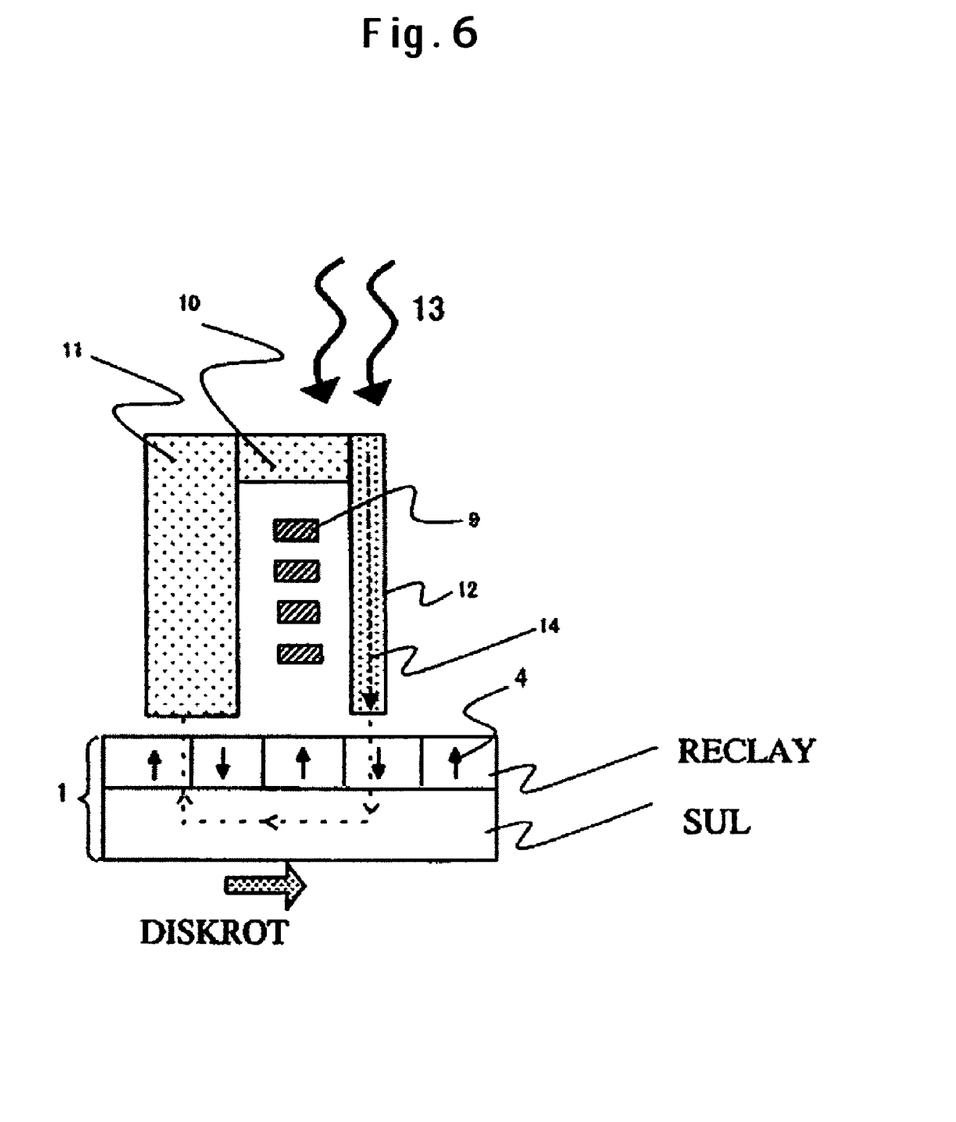
FIG. 6 is a conceptual diagram of an external magnetic field applied to a perpendicular recording device.

FIG. 4 is a sectional view of the magnetic slider 3 while FIG. 5 is a plan view showing the shapes of the coil and the magnetic pole which are depicted on the basis of superimposition. The portion I in FIG. 4 corresponds to a section cut along line A-A' shown in FIG. 5. The magnetic slider has the read head RHEAD and the write head WHEAD formed on the substrate SUB via an insulating film. The magnetic disk 1 is included in the figure to show its relation with the air bearing surface. There is an insulating film between the write head and the read head. The upper read shield 8 may be designed to serve also as an insulator for the auxiliary or lower magnetic pole piece 11 as the case may be. The read head comprises the read element 7 attached to the read shields 6 and 8. The read element comprises a magnetoresistive film, electrodes for connection with the read relay terminals 119 and a magnetic domain control film disposed between them. The magnetoresistive film is formed by laminating a free layer, a pinned layer and a diamagnetic layer. The write head comprises: the main magnetic pole piece 12 determining the recording track width; the auxiliary magnetic pole piece 11; the connecting part 10 which magnetically connects the main magnetic pole piece 12 and the auxiliary magnetic pole piece 11; and the thin film coil 9 intersecting the magnetic circuit constructed of the main magnetic pole piece 12, the auxiliary magnetic pole piece 11 and the connecting part 10. The read shields 6 and 8 and the lower magnetic pole piece 11 have substantially the same depth as the main magnetic pole piece 12. The perpendicular recording head structure is more susceptible to the external magnetic field 13 than longitudinal recording ones as shown in FIG. 6. Thus, the perpendicular recording head structure is more required to reduce the size in order to suppress the influence of external magnetic field 13. If the perpendicular magnetic head receives the external field 13, a magnetic leakage field 14 may leak from the main magnetic pole piece 12 to the recording layer RECLAY and soft magnetic layer SUL of the medium, which may have influence on the magnetization pattern 4. In this situation, the read shields 6 and 8 and the upper and lower magnetic pole pieces 11 and 12 must have the same depth (length from the air bearing surface). If the opposite ends of these magnetic members, as viewed from the air bearing side, are not aligned with each other, the external magnetic field 13 may result in erasing magnetic field since magnetic flux concentration is likely to occur. Therefore, the read shields 6 and 8 and the lower magnetic pole piece 11, formed below the write coil, are not extended deeper than the center of the write coil where the write coil is connected with a wire which leads to a write relay terminal so that they have the same depth as the upper magnetic pole piece. Accordingly, any magnetic members which are extended from the air bearing surface are terminated with dielectric material on the substrate before the portion of the above coil which is deeper than the main magnetic pole piece 12 and the auxiliary magnetic pole piece 11. The upper magnetic pole piece 12 used to generate strong recording magnetic field is made of high saturation flux density (Bs) material such as FeCo while the lower magnetic pole piece 11, the read shields 6, 8 and the connecting part 10 are made of soft magnetic material such as NiFe. The ratio of the air bearing area of the main magnetic pole piece 12 to that of the auxiliary magnetic pole piece 11 is not larger than about 1:100. The II portion of the sectional view includes the anti-corrosion terminal 15. The III portion of the sectional view includes the write terminal 118. The upper magnetic pole piece 12 is apt to corrode through cell reaction during processing of the air bearing surface since the material of the lower magnetic pole piece 11 is electrochemically nobler than the material of the upper magnetic pole piece 12. The terminal 15 is provided to prevent this corrosion. The wire 17 connected with the terminal 15 is formed by using the same wire layer of nonmagnetic material as the wire 21a which connects the write coil 9 and the write relay terminal 118. Use of nonmagnetic material makes it possible to prevent a magnetic field from propagating to the main pole piece through the wire from the anti-corrosion terminal and having influence on the magnetization pattern. In addition, connecting the wire 17 with the main magnetic pole piece 12, not the auxiliary magnetic pole piece 11, allows the wire 17 to be formed by using the same wire layer as the wire 21a which connects the write coil 9 and the write relay terminal 118 which is provided at a side surface of the slider in order to pass an electrical current through the coil. The wire material may be copper Cu, gold Au, ruthenium Ru, rhodium Rh, palladium Pd, tantalum Ta, nickel phosphide NiP or nickel palladium NiPd. From the viewpoint of wiring resistance and process, copper is preferable. For process conformity with the connecting part 10 and the main magnetic pole piece 12, the coil 9 is connected with the write relay terminal 118 at the connecting part via films 22 (a riser to connect the coil to the wire) which are formed by respectively using the same layers as the connecting part 10 and the main magnetic pole piece 12. The coil, magnetic pole pieces, shields and the other magnetic members and the wires are isolated from each other by insulating films 23 made of alumina or the like. The insulating films 23 are deposited by sputtering.

Figure 7:
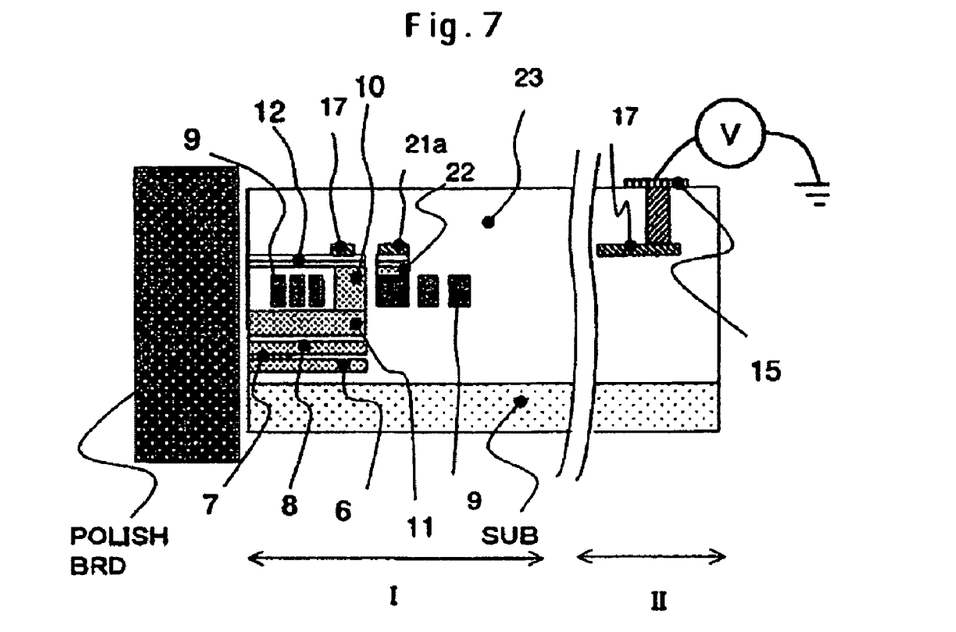
FIG. 7 schematically shows how the anti-corrosion electrodes operate during processing of the air bearing surface.

Referring to FIG. 7, the following provides a description of the anti-corrosion terminal 15. If the write coil 9 is made of high saturation flux density material, cell reaction may occur to cause corrosion of the magnetic pole piece while the air bearing surface is processed, in particular, during the air bearing surface polishing and washing steps where the perpendicular recording head is dipped in an aqueous solution or a solvent. The present invention prevents corrosion of the magnetic pole piece during processing of the air bearing surface by setting higher the standard electrode potential of the magnetic pole piece so as to suppress the cell reaction. For this purpose, the terminal 15 to give a voltage V during processing of the air bearing surface is formed with the wire 17 to connect it to the magnetic pole piece. Preferably, the anti-corrosion terminal 15 is made of a material whose standard electrode potential is higher than that of the magnetic write element alone. Specifically, the terminal is a conductor made of an elemental metal, an alloy or a compound containing a material selected from the group of metals consisting of Au, Ag, Pt, Ru, Rh, Pd, Os and Ir or the group of conductive ceramics consisting of Al2O3.TiC, SiC, TiC, WC and B4C. In addition, the surface area of the terminal is larger than the air bearing surface area of the magnetic film element, which also contributes to retardation of metal dissolution from the magnetic recording element in the aqueous solution. The voltage V applied to the terminal 15 raises the standard electrode potential of the magnetic recording element in the aqueous solution (for example, a lapping or washing fluid). With the terminal thus energized, the standard electrode potential of the magnetic recording element to be prevented from corrosion is shifted into the passivity region in the aqueous solution. Note that the air bearing surface processing steps include a step where the air bearing surfaces of magnetic sliders cut out as a bar are polished by a polish board POLISHBRD and washed in a washing fluid such as pure water and a step where washing is done in a washing fluid such as pure water after protective films are deposited, wing-shaped rails are formed and the bar is cut into chips.

Figure 8:
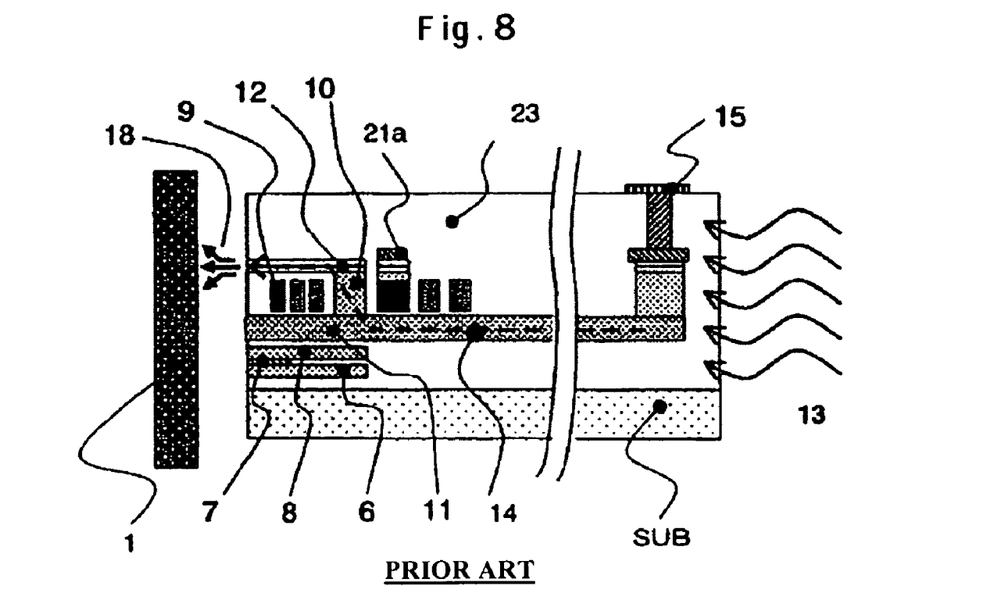
FIG. 8 is a conceptual diagram of an external magnetic field applied to an example device for comparison.
Figure 9:
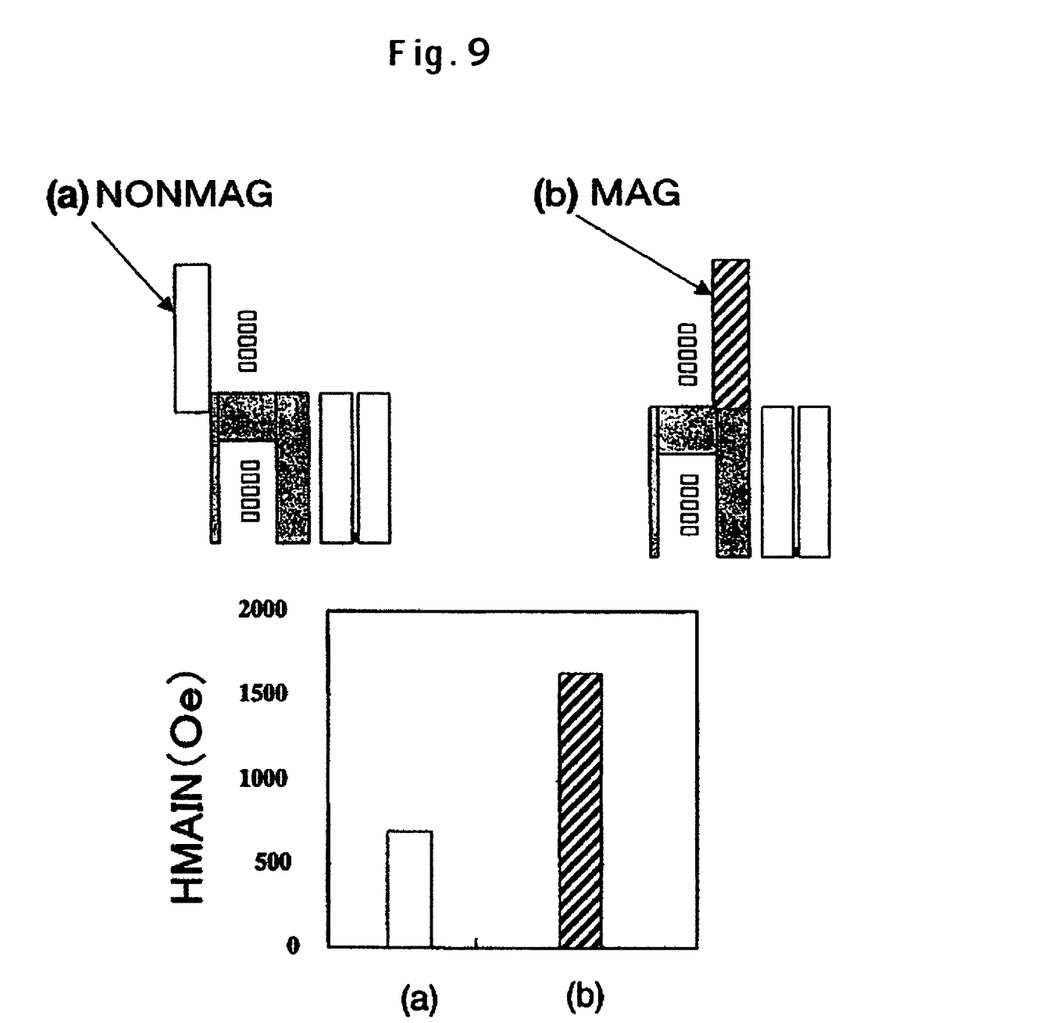
FIG. 9 shows the dependence of the main magnetic pole piece's magnetic leakage field caused by the external magnetic field upon whether the anti-corrosion electrode is connected by magnetic material or nonmagnetic material.

As an example for comparison, FIG. 8 shows a sectional view of a slider 3 in which the anti-corrosion electrode 15 is connected to the lower magnetic pole piece 11. If an external magnetic field 13 is applied, the external magnetic field 14 propagates through the main magnetic pole piece 12 causing a magnetic leakage field 18 propagating to the medium since the lower magnetic pole piece 11 is extended to a place above which the outermost coil portion is formed. This may result in disturbing the recorded magnetization pattern on the medium. FIG. 9 shows calculation results of analyzing the dependence of the magnetic leakage field upon how the anti-corrosion electrode is connected to the magnetic pole. The strength of magnetic leakage field from the main magnetic pole piece is plotted as HMAIN (Oe). A 40 Oe external magnetic field is assumed. In (a), the anti-corrosion electrode is connected to the main magnetic pole piece by a nonmagnetic member NONMAG while in (b), the electrode is connected to the auxiliary magnetic pole piece by a magnetic member MAG. From the figure, it is found that connecting the anti-corrosion electrode to the main magnetic pole piece by using a nonmagnetic material effectively prevents the external magnetic field 13 from causing the main magnetic pole piece to produce magnetic leakage magnetic field. If the anti-corrosion electrode is connected to the lower magnetic pole piece by using a magnetic material as shown in (b), the main magnetic pole piece produces strong magnetic leakage field.

Embodiment 2

Figure 10:
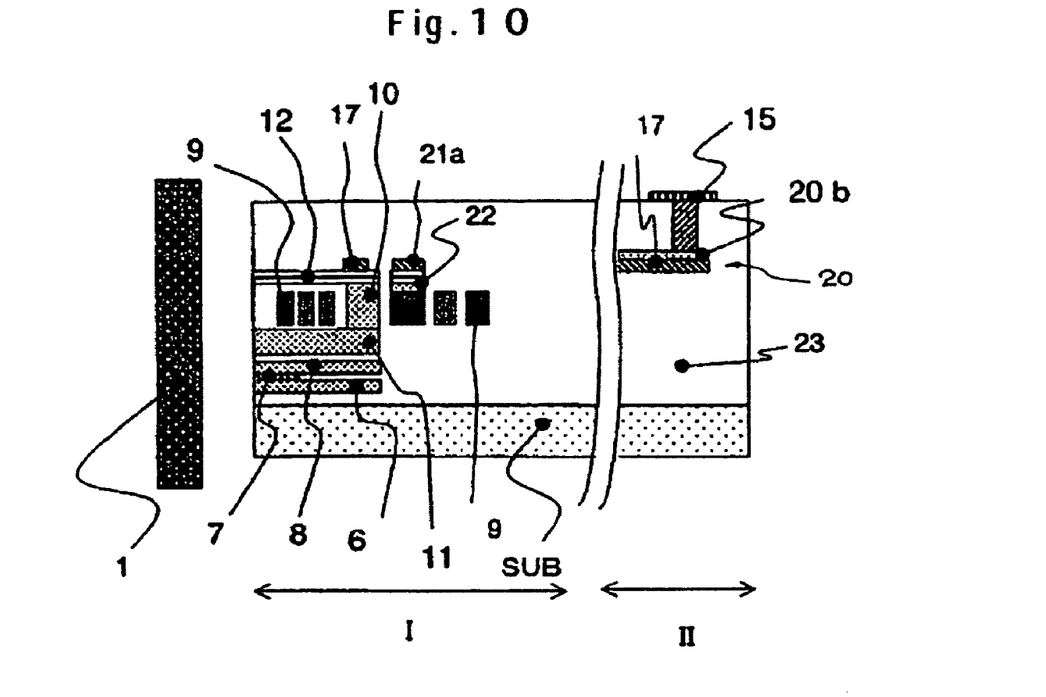
FIG. 10 a sectional view of a magnetic head (second embodiment).
Figure 11:
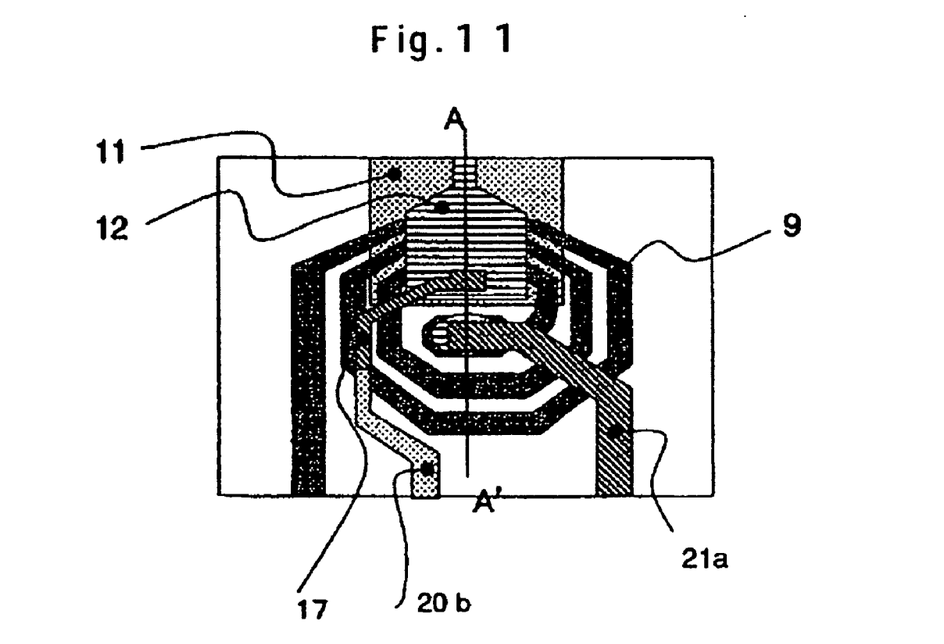
FIG. 11 is a plan view of the magnetic head (second embodiment) depicted in a superimposed manner.

FIG. 10 is a sectional view of a magnetic slider 3 according to a second embodiment or a modified example of the first embodiment while FIG. 11 is a plan view showing the shapes of the coil and the magnetic pole which are depicted on the basis of superimposition. The portion I of the section in FIG. 10 corresponds to line A-A' shown in FIG. 11. This example is different from the first embodiment in that a wire 20 is formed by coating the nonmagnetic wire 17 with a magnetic material. When the nonmagnetic wire 17 is made of such a material as copper, if such a process as ion milling is performed to selectively etch a grown copper film, copper seeds may deposit again on the copper film. If copper seeds are detached, it is possible that wires may be short-circuited. Thus, the upper and side surfaces of the nonmagnetic wire 17 are partly coated with a magnetic film of NiFe or the like having relatively high corrosion resistance. This makes it possible to selectively remove the grown copper film by wet etching. That is, connecting the lead wire of the recording magnetic pole piece 12 to the plug of the anti-corrosion terminal 15 via a magnetic film can prevent the wire from being short-circuited with another wire since such metal seeds do not attach to the grown film in the wet etching. Note that a magnetic film is also formed where the coil 12 and the lead wire 21a of the write relay terminal 118 are bonded. Formed of the same layer as the magnetic film 20a, this magnetic film secures conduction between them. Since the wire 20 is not entirely coated with the magnetic film 20b and therefore the non-coated portion of the wire 20 does not propagate external magnetic field, it is possible to prevent the external magnetic field from causing the main magnetic pole piece to produce magnetic leakage field. Preferably, the space between the portion of the wire 20 coated with the magnetic material and either the main magnetic pole piece 12 or the portion where the wire 20 is magnetically coupled with the main magnetic pole piece 12, that is, the length of the portion where conduction is secured by the nonmagnetic material, is at least 3 microns to prevent magnetic field from propagating through the portion coated with the magnetic material.

Embodiment 3

Figure 12:
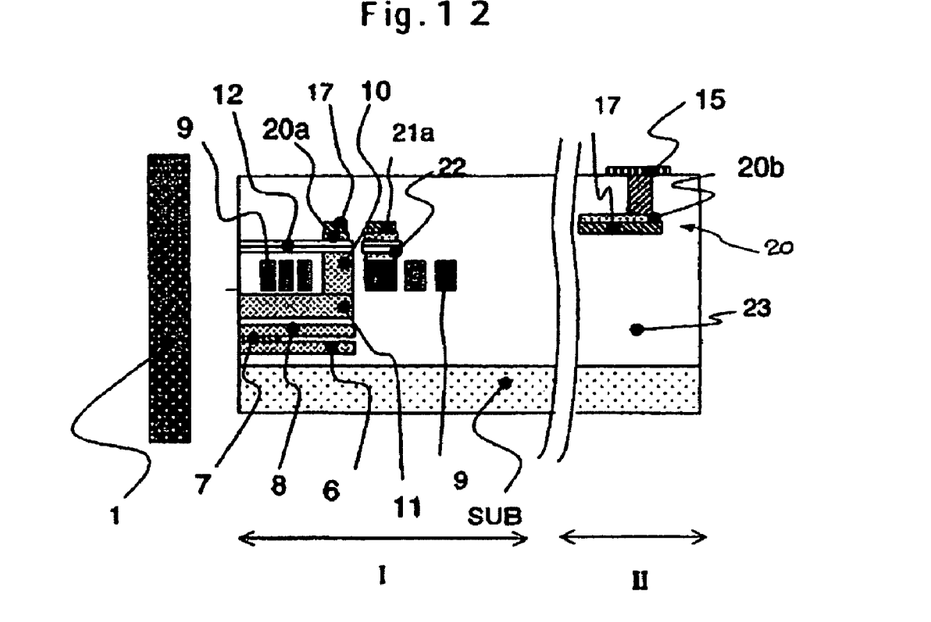
FIG. 12 is a sectional view of a magnetic head (second embodiment).
Figure 13:
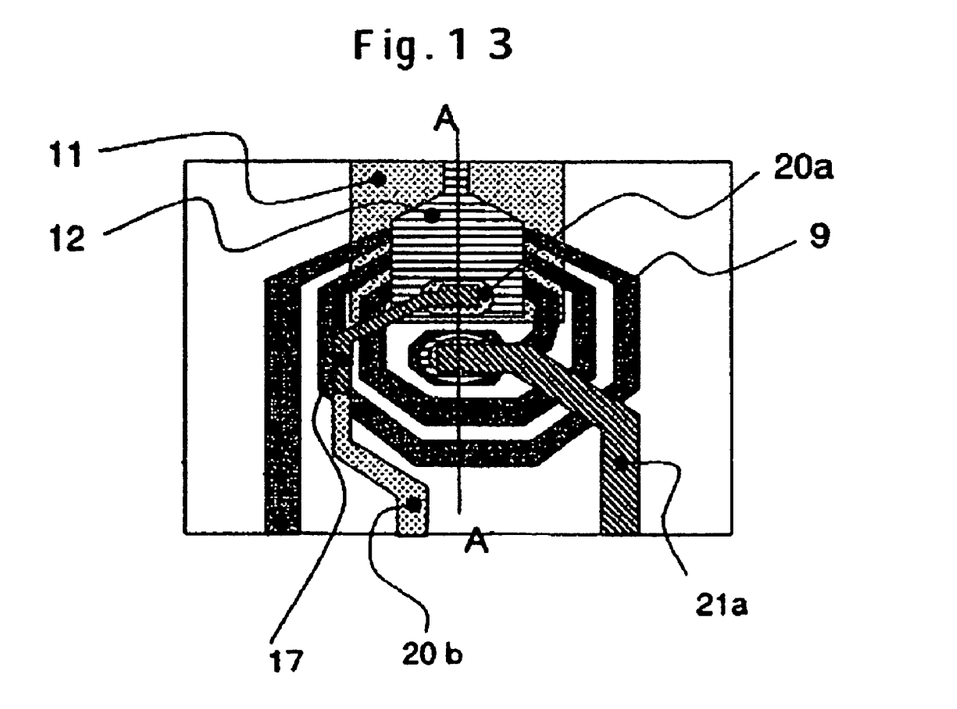
FIG. 13 is a plan view of the magnetic head (third embodiment) depicted in a superimposed manner.

FIG. 12 is a sectional view of a magnetic slider 3 according to a third embodiment or a modified example of the first and second embodiments while FIG. 11 is a plan view showing the shapes of the coil and the magnetic pole which are depicted on the basis of superimposition. The portion I of the section in FIG. 12 corresponds to line A-A' shown in FIG. 13. This embodiment is different from the first embodiment in that a wire 20 is formed by partly coating the nonmagnetic wire 17 with a magnetic material. What is different from the second embodiment is that a magnetic film 20a is formed on the top of the main magnetic pole piece 12 in addition to that formed below the plug of the anti-corrosion terminal 15. Since the magnetic film is bonded to the main magnetic pole piece via the magnetic film, that is, the main magnetic pole piece is not in direct contact with nonmagnetic material, it is possible to prevent the main magnetic pole piece from corroding during wet etching of the grown film in preparation of the protective film 23 of alumina. Since the wire 17 which connects the anti-corrosion terminal 15 and the recording magnetic pole 12 has a nonmagnetic portion not coated with magnetic material, it can prevent magnetic propagation. Thus, the penetration of an external magnetic field 13 into the main magnetic pole piece 12 can be retarded to some extent.

Embodiment 4

Figure 14:
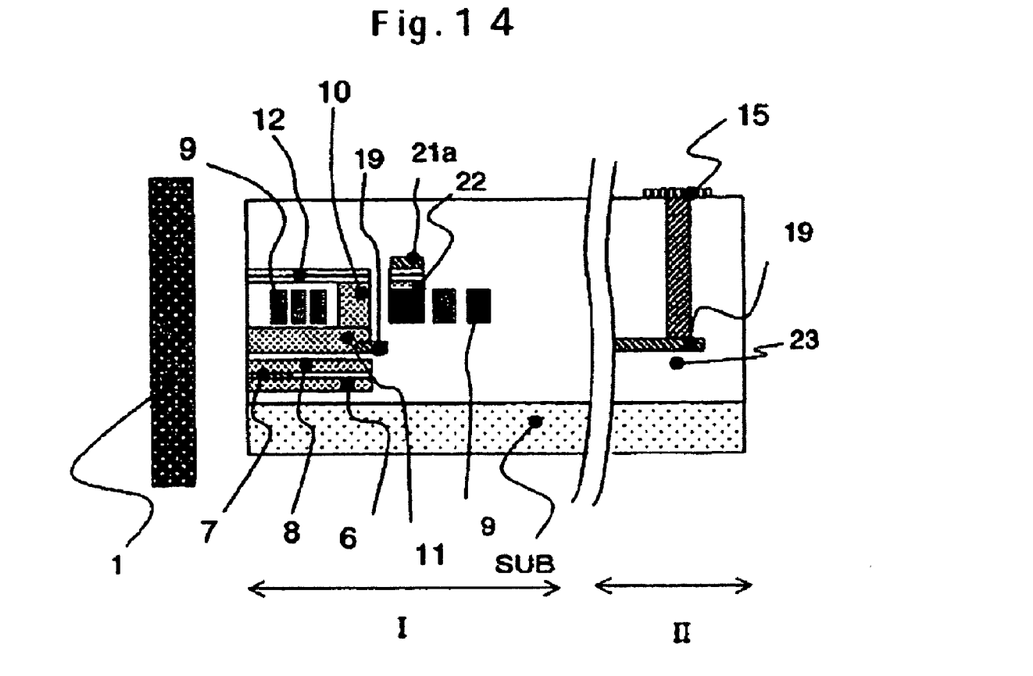
FIG. 14 is a sectional view of a magnetic head (fourth embodiment).
Figure 15:
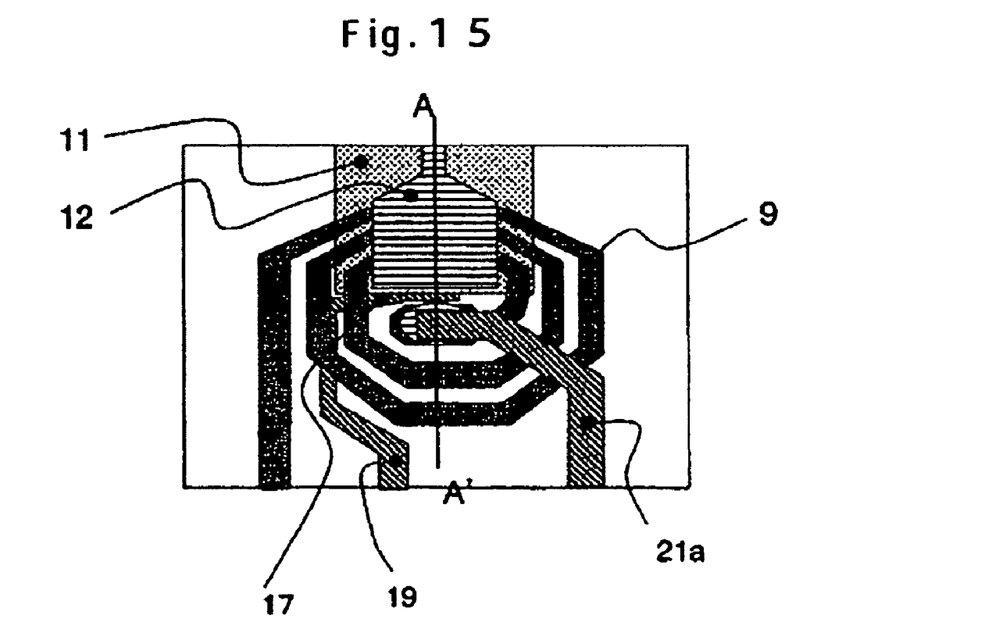
FIG. 15 is a plan view of the magnetic head (fourth embodiment) depicted in a superimposed manner.

FIG. 14 is a sectional view of a magnetic slider 3 according to a fourth embodiment or a modified example of the first embodiment while FIG. 15 is a plan view showing the shapes of the coil and the magnetic pole which are depicted on the basis of superimposition. The portion I of the section in FIG. 14 corresponds to line A-A' shown in FIG. 15. In this embodiment, not the main magnetic pole piece 12 but the auxiliary magnetic pole piece 11 is connected to the anti-corrosion terminal 15 via a nonmagnetic wire 19. Although it is also possible to extend the lower magnetic pole piece 11 and bond it to the via hole of the external terminal, this may cause concentration of external magnetic field into the elongated lower magnetic pole piece, resulting in a magnetic leakage field to the medium from the main magnetic pole piece. Therefore, the auxiliary magnetic pole piece 11 of soft magnetic material and the wire 17 of nonmagnetic material are formed separately by different processes so as to prevent the propagation of the external magnetic field.

The nonmagnetic wire 17 and the auxiliary magnetic pole piece 11 are formed as below. The nonmagnetic wire 17 is formed by plating at first and then the auxiliary magnetic pole piece 11 is formed also by plating. Subsequently, after an alumina insulating film 23 is formed thereon, the top surface of the lower magnetic pole piece 11 is planarized by CMP in preparation for formation of the coil. Since the film thickness (height) of the nonmagnetic wire 17 is made smaller than that of the lower magnetic pole piece, it is possible to prevent disconnection of the nonmagnetic wire in this process of planarizing the top of the lower magnetic pole piece. The anti-corrosion wire 17 is connected to the main magnetic pole piece 12 not directly but via a member which is electrically connected with the main magnetic pole piece. This embodiment provides substantially the same effect as the first embodiment although the manufacturing process is complicated.

Embodiment 5

Figure 16:
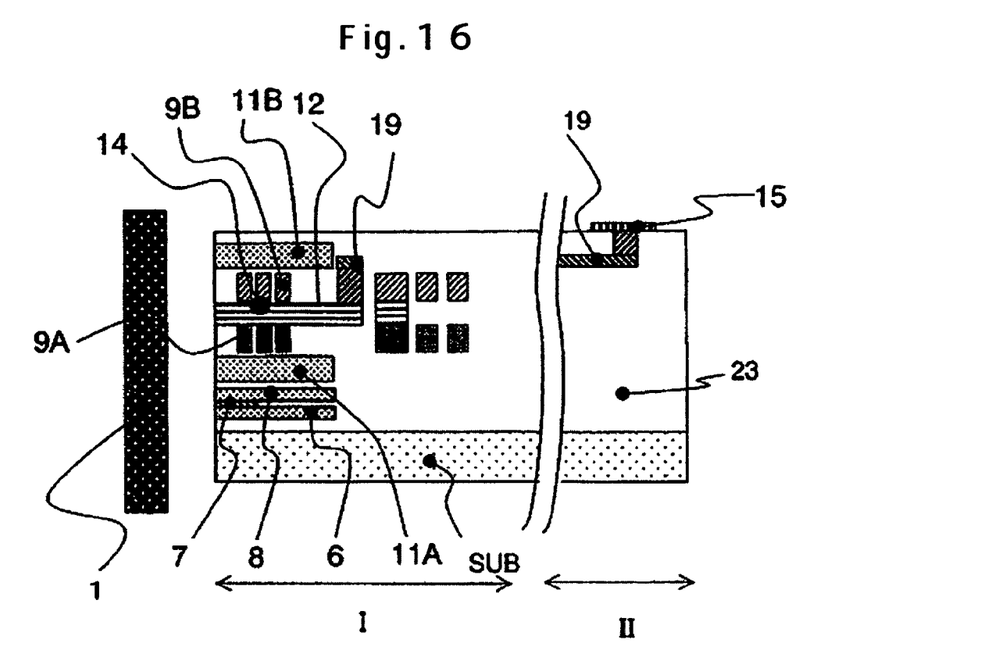
FIG. 16 is a sectional view of a magnetic head (fifth embodiment).
Figure 17:
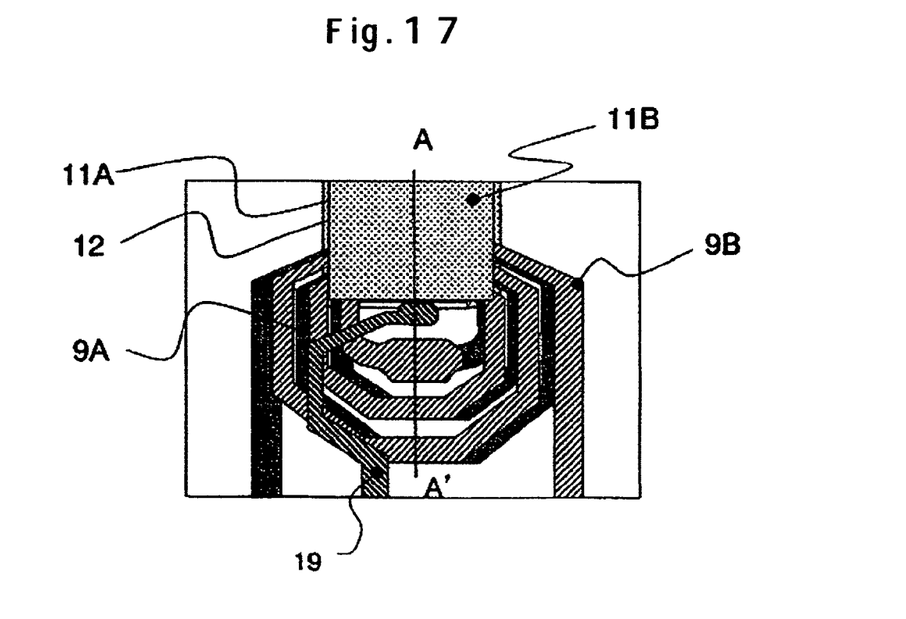
FIG. 17 is a plan view of the magnetic head (fifth embodiment) depicted in a superimposed manner.

FIG. 16 is a sectional view of a magnetic slider 3 according to a fifth embodiment or a modified example of the first embodiment, while FIG. 17 is a plan view showing the shapes of the coil and the magnetic pole which are depicted on the basis of superimposition. The portion I of the section in FIG. 16 corresponds to line A-A' shown in FIG. 17. This embodiment provides a perpendicular recording head (cuff type magnetic head or the like) that has no electric/magnetic connecting part 10 between the main magnetic pole piece 12 and the auxiliary magnetic pole pieces 11. This embodiment has auxiliary magnetic pole pieces 11A and 11B respectively below and above the main magnetic pole piece 12 and has a double-layered coil structure consisting of a coil 9A and a coil 9B. The upper coil 9B and the lower coil 9A are connected via a film made of the same material as the main magnetic pole piece 12. The terminal to which a voltage is applied during processing of the main magnetic pole piece and the air bearing surface is made of nonmagnetic material, making it possible to prevent external magnetic field from causing the main magnetic pole piece to produce magnetic leakage field.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic slider comprising:
    a read head including an upper read shield, a lower read shield, and a magnetoresistive film;
    a write head including a main magnetic pole piece, an auxiliary magnetic pole piece and a coil;
    a first wire connected with the coil;
    a terminal which is electrically connected with the write head and is formed externally; and
    a second wire which electrically connects the terminal and the main magnetic pole piece without contacting the auxiliary magnetic pole piece;
    wherein the first and second wires are formed along the same vertical plane with respect to a magnetic disk, and above all portions of the main magnetic pole piece;
    wherein neither the auxiliary magnetic pole piece nor the read head extend at a depth below a section where the coil is joined with the first wire which connects the coil to a write terminal such that the upper read shield, the lower read shield, the main magnetic pole piece, and the auxiliary magnetic pole piece are aligned at a position away from an air bearing surface.

2. A magnetic slider according to claim 1, wherein the first wire and the second wire are made of a nonmagnetic material.

3. A magnetic slider according to claim 2, wherein the nonmagnetic material is copper.

4. A magnetic slider according to claim 1, wherein said terminal is a terminal to which a voltage is applied during processing of an air bearing surface of the magnetic slider.

5. A magnetic slider comprising:
a read head including an upper read shield, a lower read shield, and a magnetoresistive film;
a write head including a main magnetic pole piece, an auxiliary magnetic pole piece and a coil;
a terminal which is externally formed to apply a voltage to the main magnetic pole piece; and
a wire to electrically connect the terminal and the main magnetic pole piece without contacting the auxiliary magnetic pole piece;
wherein the wire is made of a nonmagnetic material; and
wherein the auxiliary magnetic pole piece does not extend below a section where the wire is bonded such that the upper read shield, the lower read shield, the main magnetic pole piece, and the auxiliary magnetic pole piece are aligned at a position away from an air bearing surface;
wherein the wire is formed along the same vertical plane with respect to a magnetic disk as another wire which connects the coil to a write terminal.

6. A magnetic slider according to claim 5, wherein the nonmagnetic material is copper.

7. A magnetic slider comprising:
a read head including a magnetoresistive film;
a write head including a main magnetic pole piece, an auxiliary magnetic pole piece and a coil;
a terminal which is electrically connected to the main magnetic pole piece and is externally formed; and
a first wire to connect the terminal and the main magnetic pole piece without contacting the auxiliary magnetic pole piece;
wherein the first wire is made of a nonmagnetic material
wherein the first wire is formed along the same vertical plane with respect to a magnetic disk as a second wire which connects the coil to a write terminal
wherein the auxiliary magnetic pole piece is not extended until below a section where the second wire is bonded to the coil, and wherein the upper read shield, the lower read shield, the main magnetic pole piece, and the auxiliary magnetic pole piece are aligned at a position away from an air bearing surface.

8. A magnetic slider according to claim 7, wherein the nonmagnetic material is copper.

9. A magnetic slider according to claim 7, wherein an insulating film is formed on an opposite side, as viewed from an air bearing surface, of a part which connects the auxiliary magnetic pole piece and the main magnetic pole piece.

* * * * *